United States Patent [19]

Hwang

[11] Patent Number: 5,880,794
[45] Date of Patent: Mar. 9, 1999

[54] ACTIVE MATRIX LIQUID CRYSTAL DISPLAY AND METHOD WITH TWO ANODIZATIONS

[75] Inventor: Kwang Jo Hwang, Kyungki-do, Rep. of Korea

[73] Assignee: LG Electronics, Inc., Seoul, Rep. of Korea

[21] Appl. No.: 782,255

[22] Filed: Jan. 14, 1997

[30] Foreign Application Priority Data

Mar. 15, 1996 [KR] Rep. of Korea ............... 1996 7051

[51] Int. Cl.$^6$ ............... G02F 1/1343; G02F 1/136
[52] U.S. Cl. ............... 349/39; 349/38; 349/43; 438/30
[58] Field of Search ............... 349/43, 38, 39; 438/30, 158, 166

[56] References Cited

U.S. PATENT DOCUMENTS

5,402,254 3/1995 Sasano et al. ............... 349/38

Primary Examiner—Anita Pellman Gross
Attorney, Agent, or Firm—Finnegan, Henderson, Farabow, Garrett & Dunner, L.L.P.

[57] ABSTRACT

A method for manufacturing an AMLCD with TFTs comprises the steps of: depositing a metal layer on a glass substrate; forming gate bus line pads, gate bus lines, gate electrodes, and storage capacitance electrodes by patterning the metal layer; forming a first anodized layer on the gate bus line pads, gate bus lines, gate electrodes, and storage capacitor electrodes; and forming a second anodized layer on the first anodized layer except portions thereof overlying the gate bus line pads and the storage capacitance electrode. Accordingly, hillocks, resulting from overetching of the metal layer by a photoresist developer can be prevented, and the capacitance of the storage capacitance electrode is increased. Also, the second anodized layer improves electrical isolation between conductive components of the LCD.

31 Claims, 9 Drawing Sheets

FIG. 1

PRIOR ART

ACTIVE MATRIX LIQUID CRYSTAL DISPLAY AND METHOD WITH TWO ANODIZATIONS

BACKGROUND OF THE INVENTION

1. Field of the Invention

The present invention relates to a method for manufacturing a liquid crystal display (or "LCD") using a thin film transistor (or "TFT"), and the structure of the LCD. Especially, the present invention relates to a method for manufacturing the TFT having a twice anodized gate electrode.

2. Description of the Related Art

LCDs have been used in a miniature display devices, such as sub-miniature TVS and display devices for battery driven note-book computers, because they consume less electric power than other displays do. LCD color displays are formed by combining liquid crystal panels with color filters. Recently, research efforts have focused on color displays, resulting in many LCD color displays being brought to market. The active matrix driving method is the most common method used to drive an LCD display. Displays driven in this fashion are known as AMLCDs (active matrix liquid crystal displays) and comprise thin film transistors as switching elements for each pixel element of the display. AMLCDs are expected to replace cathode ray tubes ("CRTs") in many video applications.

Figure 1:
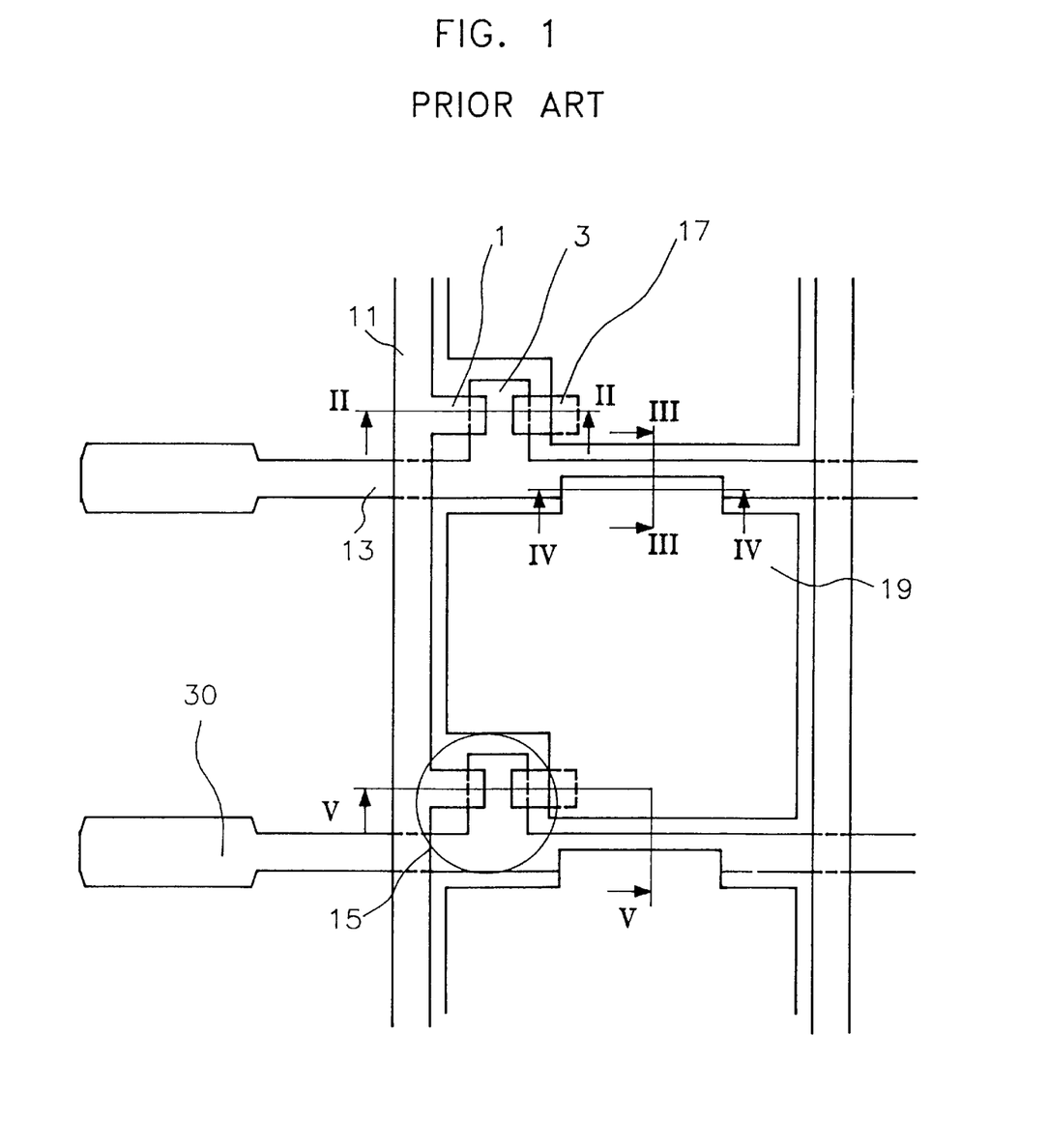
FIG. 1 is a plan view showing a portion of a conventional AMLCD.

FIG. 1 is a plan view showing an AMLCD substrate including TFT switching elements.

The AMLCD includes pluralities of gate 13 and source 11 bus lines extending horizontally and vertically, respectively. A gate electrode 3 protruding from the gate bus line 13 is formed near the intersection of each source bus line 11 and each gate bus line 13. Further, a source electrode 1, extending from the source bus line 11, overlaps one side portion of the gate electrode 3, while a drain electrode 17 overlaps an opposing side portion of gate electrode 3. Thus, a TFT 15, comprising gate electrode 3, source electrode 1, and drain electrode 17, is formed at each intersection of a gate bus line 13 and a source bus line 11. Rectangular areas defined by the intersecting source 11 and gate 13 bus lines are referred to as the "pixels" of the LCD. In the pixel area, a pixel electrode 19 is electrically connected to the drain electrode 17.

Figure 2:
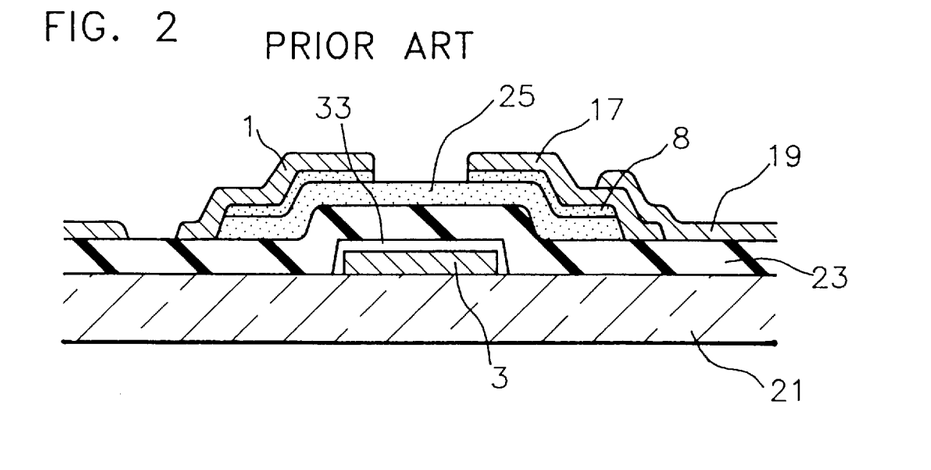
FIG. 2 is a cross-sectional view taken along a line II—II of FIG. 1.

FIG. 2 is a cross-sectional view of a TFT 15 and pixel electrode taken along line II—II of FIG. 1. As indicate above, the TFT includes gate electrode 3 formed on a transparent glass substrate 21. On the surface of the gate electrode 3, an anodized layer 33 is formed to improve performance thereof. A gate insulating layer 23 is formed on gate electrode 3 followed by a semiconductor layer 25 made of a-Si. An extrinsic semiconductor layer 8 of n+a-Si is formed on selected portions of semiconductor layer 25. Source electrode 1 and a drain electrode 17 are formed in contact with the extrinsic semiconductor layer 8 and pixel electrode 11, respectively.

Figure 3:
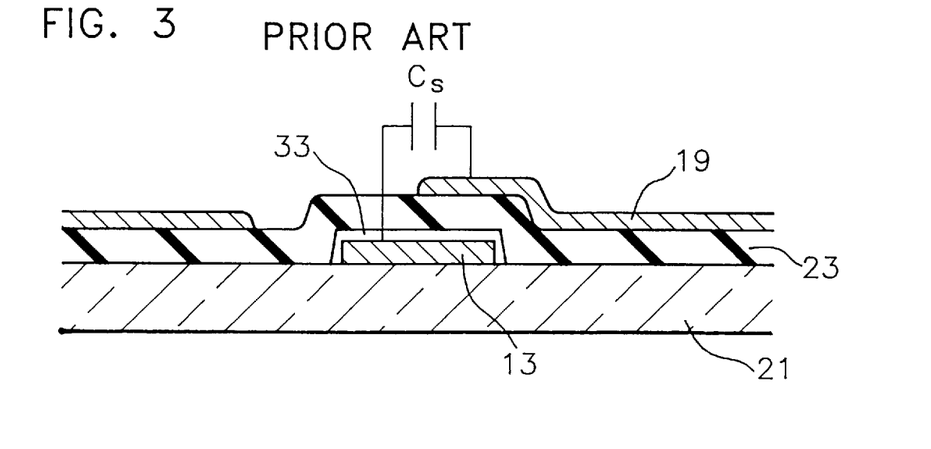
FIG. 3 is a cross-sectional view taken along a line III—III of FIG. 1.
Figure 4:
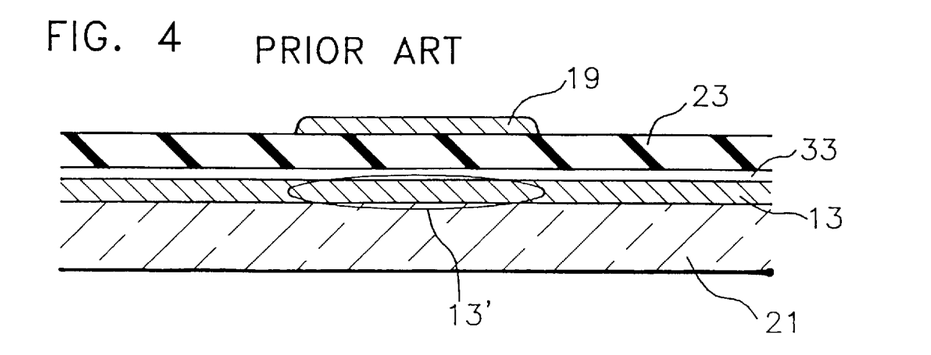
FIG. 4 is a cross-sectional view taken along a line IV—IV of FIG. 1.

FIG. 3 is a cross-sectional view of an AMLCD storage capacitance electrode taken along a line III—III of FIG. 1, and FIG. 4, is a cross-sectional view taken along a line IV—IV of FIG. 1, further illustrating the storage capacitance electrode structure.

As shown in FIG. 3, the storage capacitance electrode 13' is formed by overlapping gate bus line 13 with pixel electrode 19. As shown in FIG. 4, overlapping portions of pixel electrode 19 and gate bus line 13 constitute respective electrodes of the storage capacitance electrode 13' having capacitance Cs. Storage capacitance electrode 13' is provided in order to insure proper charging of the pixel electrode.

In particular, when the TFT 15 is turned off, the source electrode 1 and drain electrode 17 do not remain entirely isolated from one another, but are equivalent to resistors with relatively high resistances. Accordingly, when the TFT 15 is turned off, charge stored on pixel electrode 19 leaks through the TFT 15 in accordance with a characteristic time-constant proportional to the product of the resistance of the source/drain and capacitance associated with pixel.

As a result, it is necessary to periodically refresh or restore electrical charge to pixel electrode 19. However, if the refresh is performed too often, the quality of the LCD is deteriorate. Accordingly, if the LCD is refreshed relatively infrequently, the quality of the LCD is improved. By providing the storage capacitance electrode, charge can be supplied to pixel electrode 19 to compensate for the leaked charge without frequent refresh.

A process for manufacturing a conventional LCD comprising the TFT and the storage capacitance electrode will now be described with reference to FIGS. 5A to 5F, which show cross-sectional views correspond to FIGS. 2 and 3 at stages of the manufacturing process.

Figure 5A:
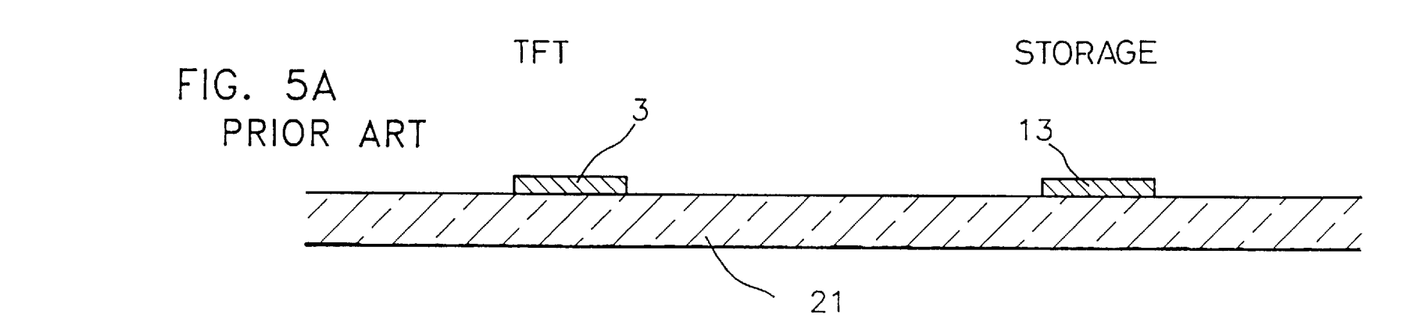
FIGS. 5A to 5F are cross-sectional views taken along a line V—V of FIG. 1 showing steps in the manufacturing process of a conventional AMLCD.
Figure 5B:
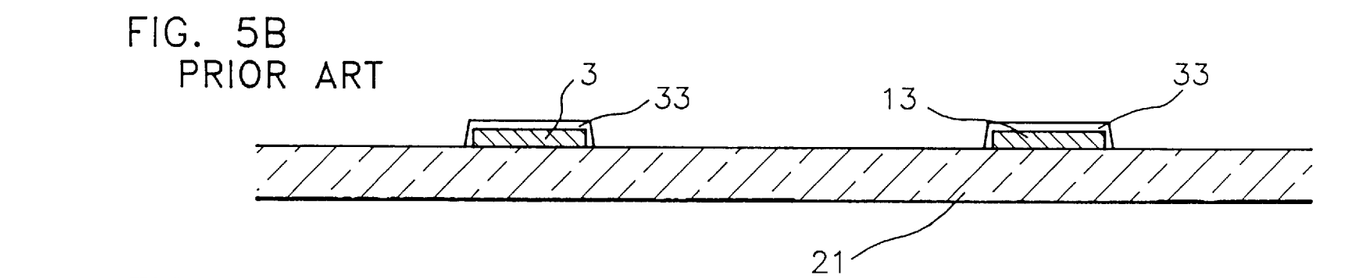

As shown in FIG. 5A, an Al layer is deposited on the entire surface of glass substrate 21, and patterned to form gate bus line pad 30, the gate bus line 13, gate electrode 3 branching out from gate bus line 13. However, the surface of the Al layer can contain defects, such as hillocks. Accordingly, an anodized layer 33 is formed on the patterned Al layer, except the gate bus line pad 30.

Figure 5C:
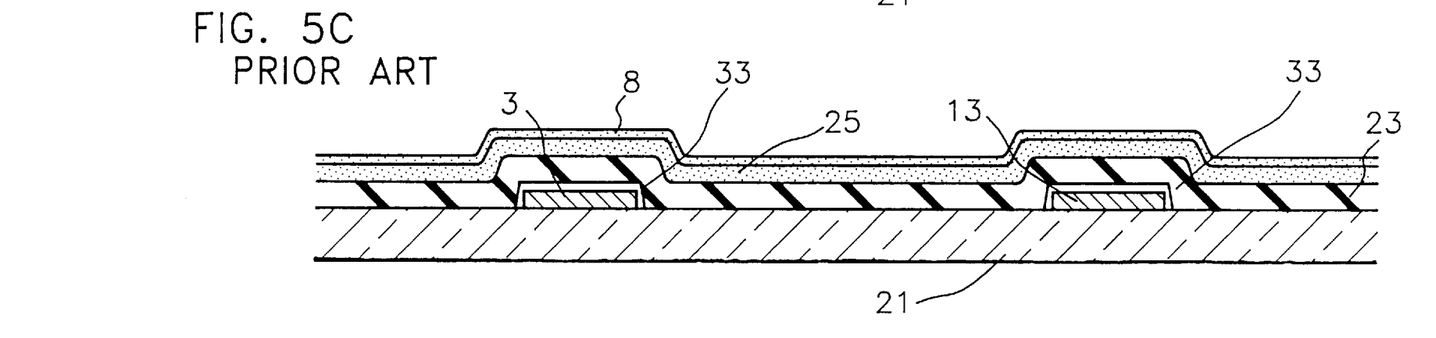
Figure 5D:
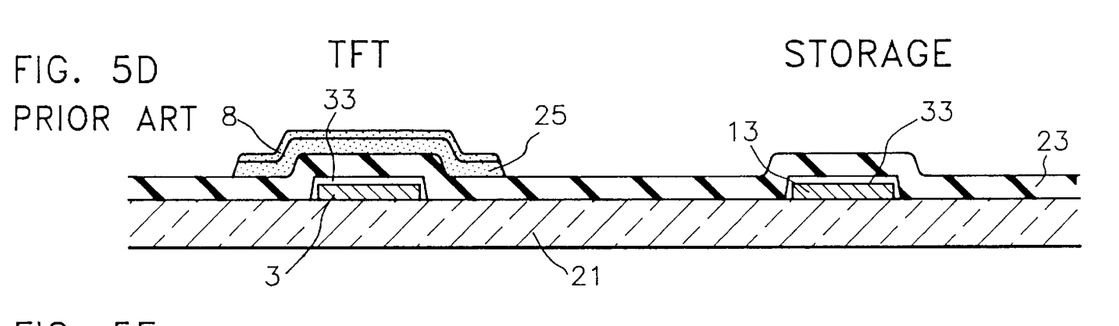
Figure 5E:
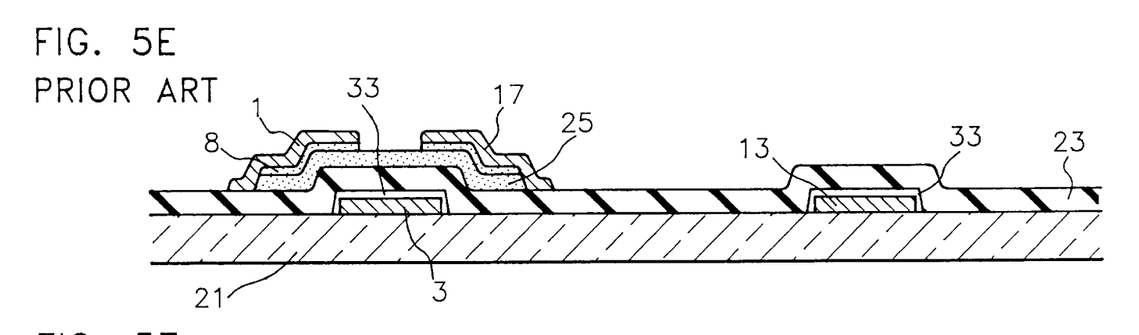
Figure 5F:
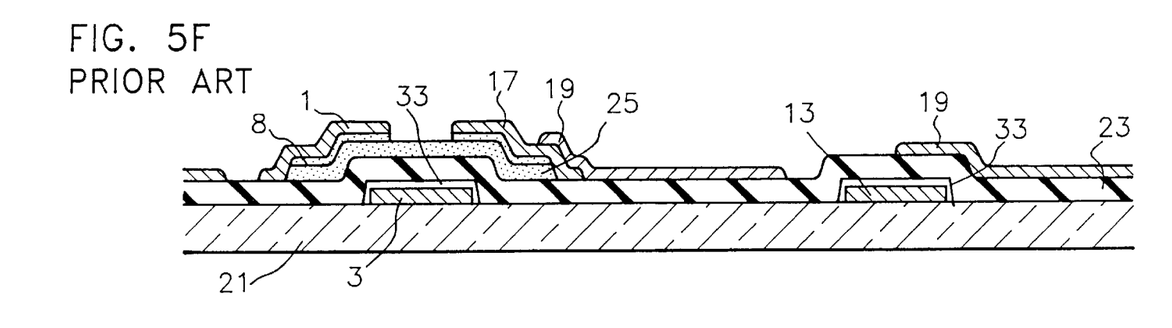

Gate insulating layer 23, a a:Si semiconductor layer 25 and an extrinsic semiconductor layer 8 are then successively deposited as shown in FIG. 5C. Next, the semiconductor layer 25 and the extrinsic semiconductor layer 8 are patterned (FIG. 5D), followed by a formation of separated source 1 and, drain 17 electrodes and an etch of the extrinsic semiconductor layer, thereby completing the conventional TFT switching element (FIG. 5E). An ITO layer is then deposited on the entire surface of the substrate using a sputtering method, and pixel electrode 19 is formed by patterning the ITO layer (FIG. 5F).

Figure 6:
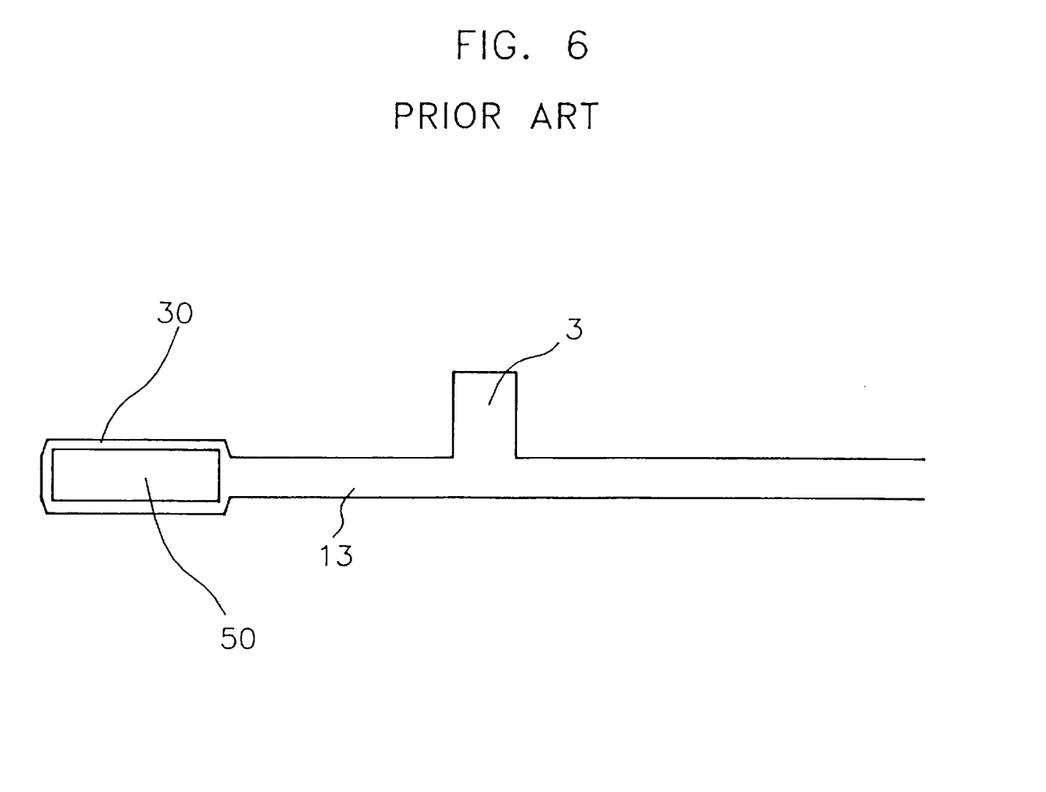
FIG. 6 is a plane view showing the gate bus lines, gate electrodes, gate bus line pad and, protecting mask in conventional AMLCD.

In the conventional method for manufacturing an AMLCD including TFTs, however, defects, such as pin-holes and over etch, can occur in the metal layer of the gate bus line by photo-resist developing solution during anodization. That is, as shown in FIG. 6, in order not to form an anodized layer on the gate line pad(30) when the gate bus line (13) is anodized, the gate line pad(30) is protected by a mask(50) made of photo-resist patterned using a photolithography process. As is well known in such processes, a photo resist layer is exposed and developed using a developer solution. Frequently, however, the developer solution can attack the surface of the gate bus line(13) or the edge of the mask(50) for protecting forming the anodized layer on gate bus line pad(30).

SUMMARY OF THE INVENTION

The objective of the present invention is to prevent the formation of defects in a metal layer resulting from exposure to a photo resist developing solution. In order to achieve this object, a method for manufacturing an AMLCD with TFTs in accordance with the present invention comprises a step of depositing a metal on the entire surface of a glass substrate, a step of patterning the metal layer into a predetermined shape; a step of first anodizing the patterned metal layer to form a thin anodized layer on the surface of the patterned metal layer; a step of second anodizing a portion of the first anodized metal layer.

An AMLCD incorporating TFTs in accordance with the present invention comprises a glass substrate; gate bus lines, gate electrodes, gate bus line pads, source bus line pads formed on the glass substrate; a first anodized layer formed on the gate bus lines, the gate electrodes, the gate and source bus line pads; and a second anodized layer formed on the first anodized layer.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DETAILED DESCRIPTION OF THE PREFERRED EMBODIMENT

Reference will now be made in detail to the present exemplary embodiments of the invention, examples of which are illustrated in the accompanying drawings. Wherever possible, the same reference numbers will be used throughout the drawings to refer to the same or like parts.

A method of manufacturing an AMLCD in accordance with the present invention will now be described with reference to FIGS. 8A–8F.

Figure 8A:
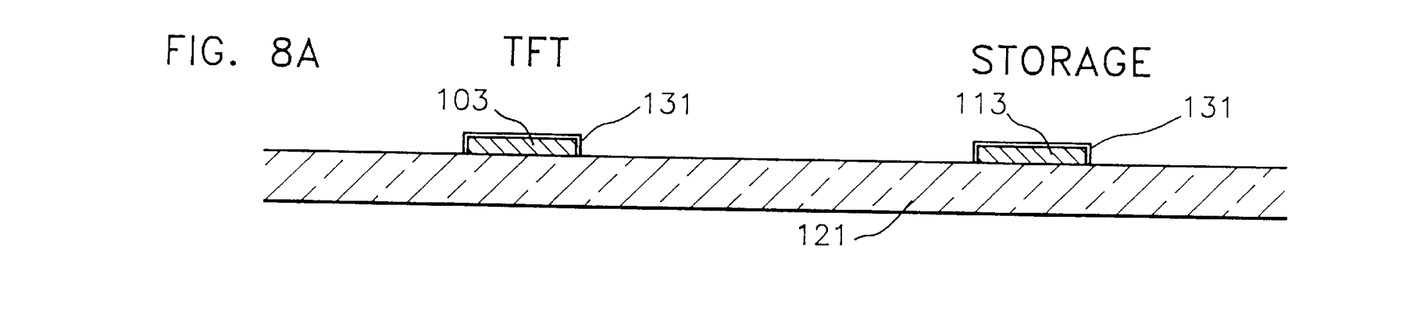
FIG. 8A to 8F are cross-sectional views taken along a line VII—VII of FIG. 6 showing the manufacturing process of an AMLCD according to the present invention.

As shown in FIG. 8A, an Al layer is first deposited on the entire surface of a glass substrate 12 and patterned to form a gate bus line pad, a gate bus line and a gate electrode 103. The gate bus line pad and gate bus line are also patterned with gate electrode 103. Gate electrode 103 is formed to extend from gate bus line.

Figure 8B:
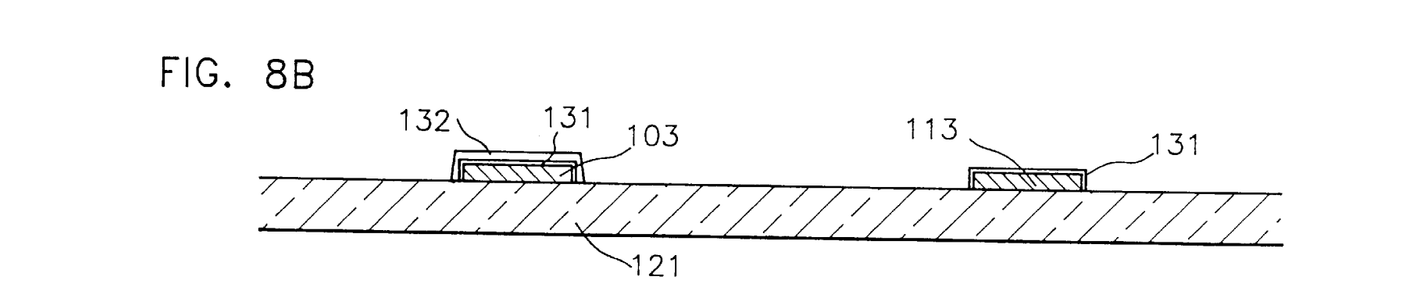

A first anodized layer 131, preferably having a thickness not more than 200 Å, is next formed on the patterned Al layer. As a result, the entire surface of the Al layer is anodized, eliminating defects such as pinholes caused by a photoresist developing solution. As shown in FIG. 8B, a second anodized layer 132 is then formed to a thickness not more than 1200 Å on the entire first anodized layer 131 except the gate bus line pad and a storage capacitance electrode 113'. Thus, the gate bus line pad and the storage capacitance electrode 113' are anodized only once.

Figure 9:
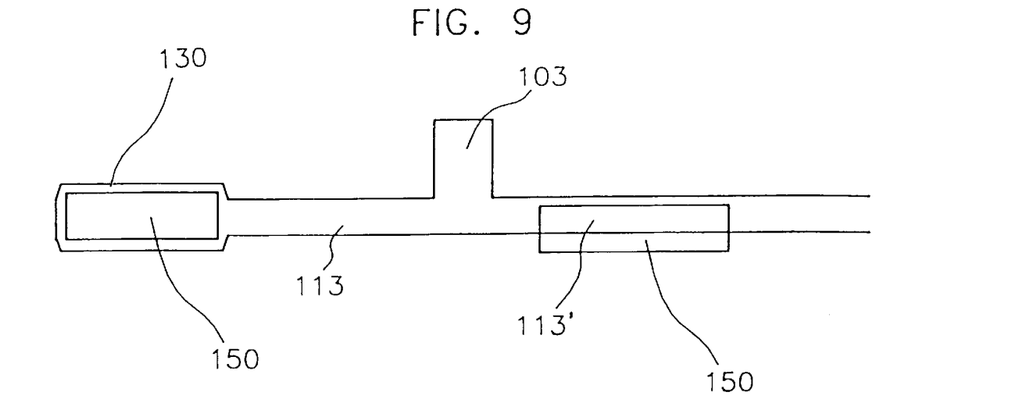
FIG. 9 is a plane view showing the gate bus lines, gate electrodes, gate bus line pad and, protecting mask in the present invention.

In this step, in order to protect forming the second anodized layer on the gate line pad(130) and the storage capacitance electrodes 113'), a protecting mask (150) is formed thereon as shown in FIG. 9. Then the attack of photo resist remover is prevented by the first anodized layer.

The anodizing is generally practiced in an electrolyte which produces a compact aluminum oxide film over the aluminum surface. The thickness of the film depends upon the selection of the electrolyte, anodizing voltage, temperature and, time. We can get wanted thickness of first and second anodized layer by controlling these facts.

It is noted that the storage capacitance electrode 113' electrode portion of gate bus line 113 need not be formed in the location illustrated in the drawing, but may extend from any portion of the gate.

Although the gate bus line pads and the source bus line pads which are connected with the driving circuit of the LCD are anodized, the resulting anodized layer is thin and preferably breaks down at 2~5 Volts when the AMLCD is driven. The second anodized layer, however is not formed on the source bus line pads and the gate bus line pads because it is relatively thick and may inhibit the formation of a good electrical contact to associated driver circuitry.

Moreover, as noted above, the second anodized layer is preferably not formed on the storage capacitance electrode 113' because hillock and unevenness are rarely caused by the first anodized layer on the storage capacitance electrode 113'. Further, the capacitance Cs of the capacitance storage element is defined by the following formula:

$$C_S \propto = \frac{\text{(rate of induce electricity)} \times S(\text{area of capacitor storage element})}{d(\text{distance between the capacitor storage electrode})}$$

Preferably, Cs should be relatively high, which can be achieved by reducing the parameter d. Accordingly, the second anodized layer is next formed on electrode 113' in order to reduce the thickness of the insulating layer separating overlapping portions of pixel electrode 19 and gate bus line 13, thereby lowering d as much as possible.

Figure 7:
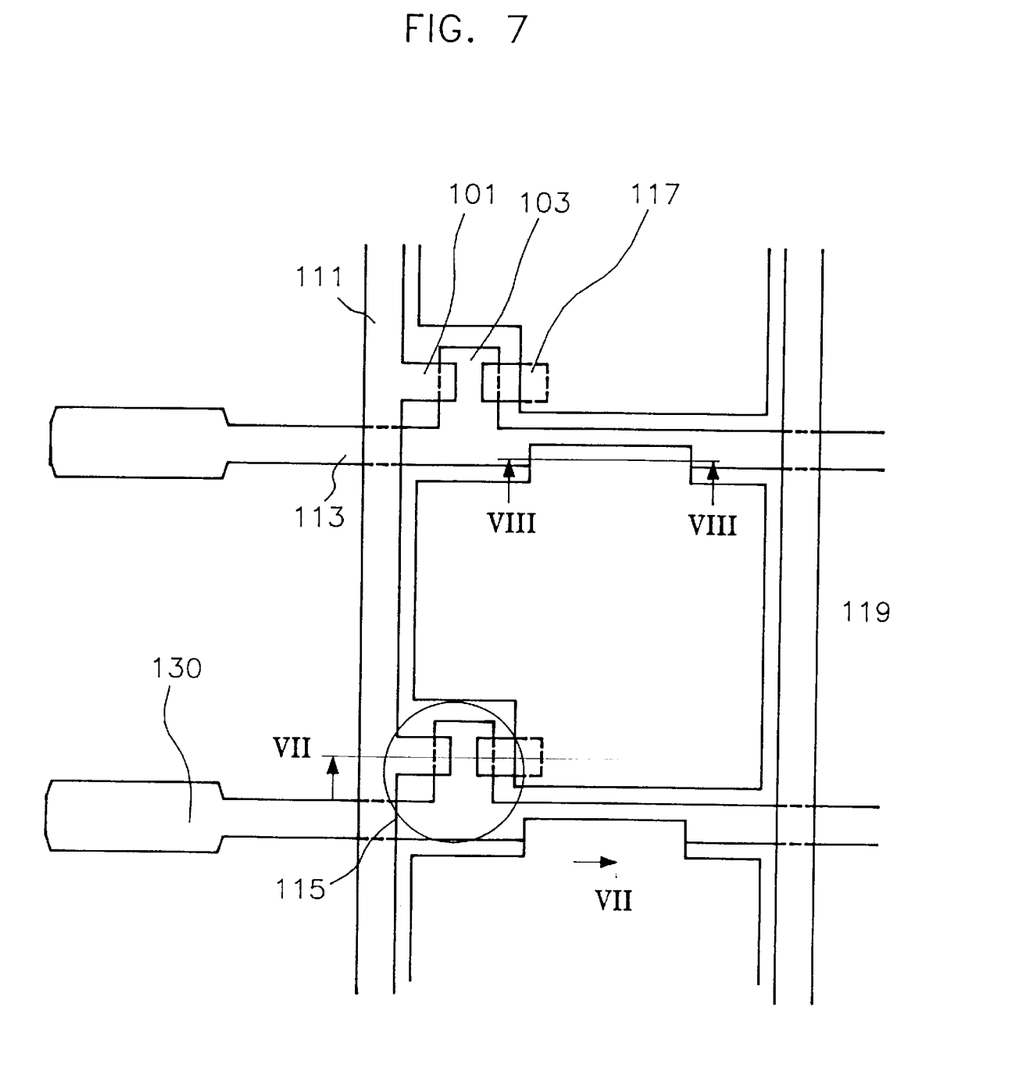
FIG. 7 is a plan view showing a portion of an AMLCD according to the present invention.
Figure 8C:
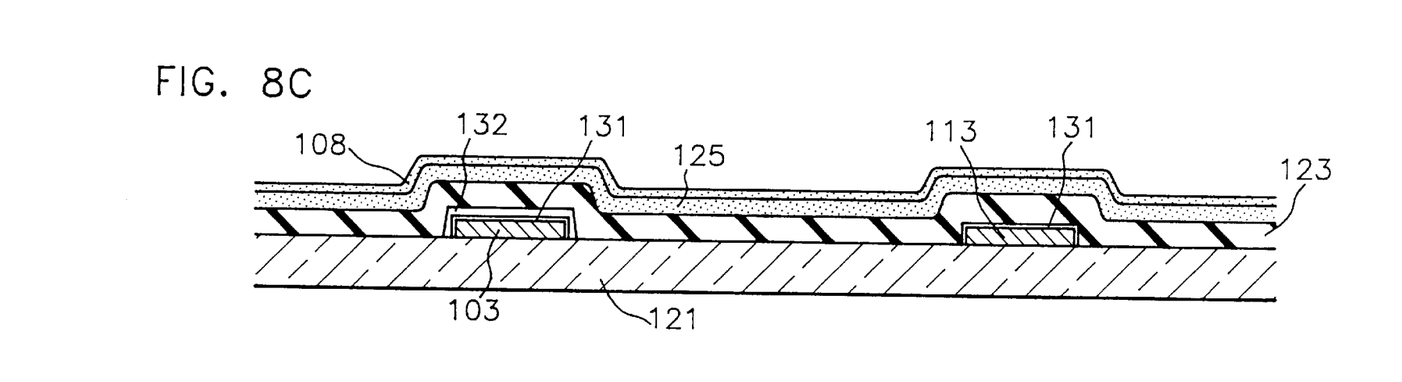
Figure 8D:
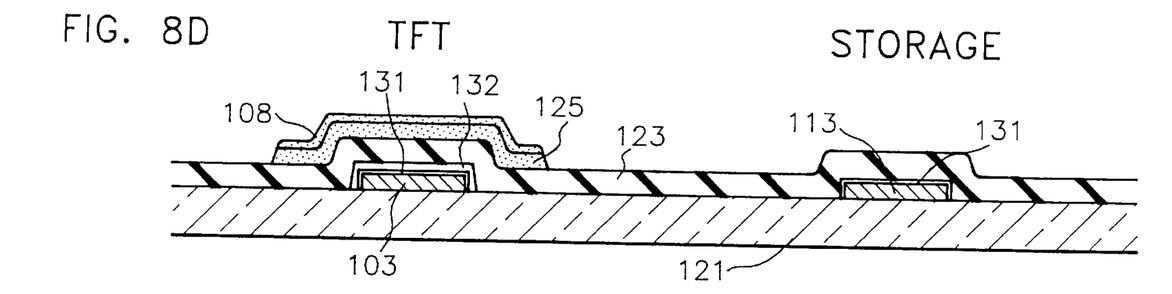
Figure 8E:
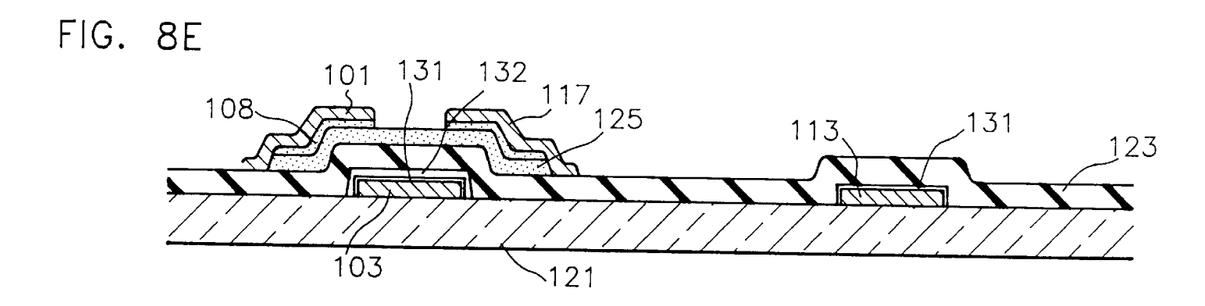
Figure 8F:
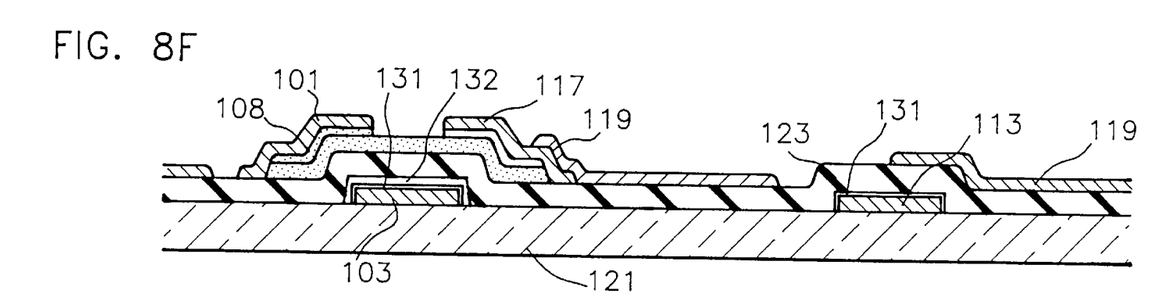

A gate insulating layer 123 and an a:Si semiconductor layer 125 and an extrinsic semiconductor layer 108 are successively deposited as shown in FIG. 8C and the semiconductor layer 125 extrinsic semiconductor layer 108 are patterned to form active areas as shown in FIG. 8D. A metal layer is deposited, and patterned to form separated source 101 and drain 117 electrodes. Then, as shown in FIG. 7D, the extrinsic semiconductor layer 108 is patterned by an etching process, thereby the separate source 101 and drain 117 electrodes arc in overlying contact with extrinsic semiconductor source and drain regions, respectively. The TFT is thus completed as shown in FIG. 8E. Afterward, an ITO layer is deposited on the entire substrate surface using a sputtering method and subsequently patterned to form pixel electrode 119 (see FIG. 8F).

Figure 10:
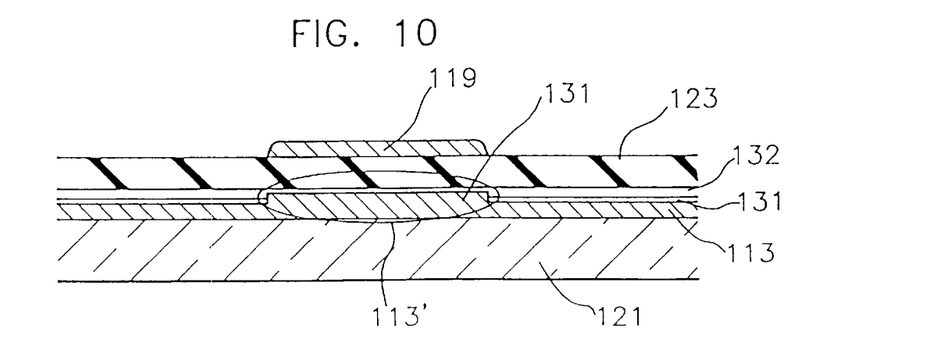
FIG. 10 is a cross-sectional view taken along a line VIII—VIII of FIG. 6.

FIG. 10 illustrates a cross-sectional view of a storage capacitance electrode in accordance with the present invention.

Specifically, first anodized layer 131 is formed on the gate bus line 113, and the second anodized layer 132 is formed on the first anodized layer except in the region of storage capacitance electrode 113', i.e., the portion beneath pixel electrode 119. Accordingly, the distance between the storage capacitance electrode 113' and the pixel electrode 119 is reduced, and therefore, the storage capacitance Cs is increased.

In the AMLCD manufacturing method in accordance with the present invention, an Al layer is deposited on a substrate and patterned into gate bus lines, gate bus line pads and, gate electrodes. The Al layer formed into the gate bus lines, gate bus line pads, and gate electrodes is then anodized, so first anodized layer is formed on the surface of them. And a second anodized layer is selectively provided except on the gate bus line pads and part of the gate bus line formation part of the storage capacitance electrod. Accordingly, the first anodized layer presents the Al layer from being over etched by a developer solution, so that defects of the Al layer rarely occur. Further, the second anodized layer improves the electrical isolation or insulation between conductive portions in the completed device, but does not inhibit electrical contact to the gate and source pads nor decrease capacitance of the storage capacitance electrode.

It will be apparent to those skilled in the art that various modifications and variations can be made in the AMLCD of the present invention and in construction of this AMLCD without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of manufacturing an AMLCD comprising the steps of:
   depositing a conductive layer on a substrate;
   patterning said conductive layer;
   forming a first insulative layer on first and second portions of said conductive layer; and
   forming a second insulative layer on said second portions of said first insulative layer.

2. A method of manufacturing an AMLCD in accordance with claim 1, wherein said step of forming said first insulative layer includes a first anodization of said conductive layer, and said step of forming said second insulative layer includes a second anodization of said conductive layer.

3. The method of manufacturing an AMLCD in accordance with claim 2, wherein said first anodization is carried out for a time period less than that of said second anodization.

4. A method in accordance with claim 2, further comprising the step of depositing a protective layer on said first portions of said conductive layer prior to said anodization.

5. A method in accordance with claim 4, wherein said protective layer includes photoresist.

6. A method of manufacturing an AMLCD in accordance with claim 1, wherein said first portions include a gate pad.

7. A method of manufacturing an AMLCD in accordance with claim 1, wherein said first portions include at least part of a storage capacitor electrode.

8. A method accordance with claim 7, wherein said storage capacitor electrode includes part of one of said second portions of said conductive layer.

9. A method of manufacturing an AMLCD in accordance with claim 1, wherein said substrate is transparent.

10. A method of manufacturing an AMLCD in accordance with claim 9, wherein said substrate comprises glass.

11. A method in accordance with claim 1, wherein said second portions include gate electrodes and gate bus lines.

12. A method in accordance with claim 1, wherein said first insulative layer has a thickness less than a thickness of said second insulative layer.

13. A method in accordance with claim 1, further comprising the step of depositing a protective layer on said first portions of said conductive layer prior to said step of forming said second insulating layer.

14. A method in accordance with claim 13, wherein said protective layer includes photoresist.

15. A method in accordace with claim 1, wherein said first insulative layer has a thickness such that said first insulative layer breaks down at potentials exceeding 5 volts.

16. A method in accordance with claim 1, wherein said first insulative layer has a thickness of 200 angstroms or less.

17. A method in accordance with claim 1, wherein said second insulative layer has a thickness of 1200 angstroms or less.

18. A method in accordance with claim 1, wherein a ratio of a thickness of said second insulative layer to a thickness of said first insulative layer is within a range of 5 to 6.

19. An active matrix liquid crystal display device, comprising:
   a substrate;
   a patterned conducive layer provided on said substrate, said patterned conductive layer having first and second portion:
   a first insulative layer disposed on said first and second portions of said conductive layer; and
   a second insulative layer disposed on said second portions of said conductive layer.

20. An active matrix liquid crystal display device in accordance with claim 19, wherein said first insulative layer includes a first anodized layer, and said second insulative layer includes a second anodized layer.

21. An active matrix liquid crystal display device in accordance with claim 19, wherein said first portions of said conductive layer include a gate pad.

22. An active matrix liquid crystal display device in accordance with claim 19, wherein said first portions of said conductive layer include at least part of a storage capacitor electrode.

23. An active matrix liquid crystal display device in accordance with claim 22, wherein said storage capacitor electrode includes part of one of said second portions of said conductive layer.

24. An active matrix liquid crystal display device in accordance with claim 19, wherein said substrate is trasparent.

25. An active matrix liquid crystal display device in accordance with claim 24, wherein said substrate comprises glass.

26. An active matrix liquidcrystal display device in accordance with claim 19, wherein said second portions include gate electrodes and gate bus lines.

27. An active matrix liquid crystal display device in accordance with claim 19, wherein said first insulative layer has a thickness less than a thickness of said second insulative layer.

28. An active matrix liquid crystal display device in accordance with claim 19, wherein said first insulative layer has a thickness such that said first insulative layer breaks down at potentials exceeding 5 volts.

29. An active matrix liquid crystal device in accordance with claim 19, wherein said first insulative layer has a thickness of 200 angstroms or less.

30. An active matrix crystal display device in accordance with claim 19, wherein said second insulative layer has a thickness of 1200 angstroms or less.

31. An active matrix liquid crystal display device in accordance with claim 19, wherein a ratio of a thickness of said second insulative layer to a thickness of said first insulative layer is within a range of 5 to 6.

* * * * *

UNITED STATES PATENT AND TRADEMARK OFFICE
CERTIFICATE OF CORRECTION

PATENT NO. :    5,880,794
DATED      :    March 9, 1999
INVENTOR(S) :   Kwang Jo HWANG It is certified that error appears in the above-identified patent and that said Letters Patent is hereby corrected as shown below:

Claim 26, Column 7, line 4, "liquidcrystal" should read --liquid crystal--.

Signed and Sealed this

Second Day of November, 1999

Attest:

Q. TODD DICKINSON

*Attesting Officer*          *Acting Commissioner of Patents and Trademarks*